July 12, 1960   J. M. BRANDSTADTER ET AL   2,944,524
ENGAGING MEANS FOR HYDRAULIC SERVO SYSTEM
Filed Aug. 10, 1954
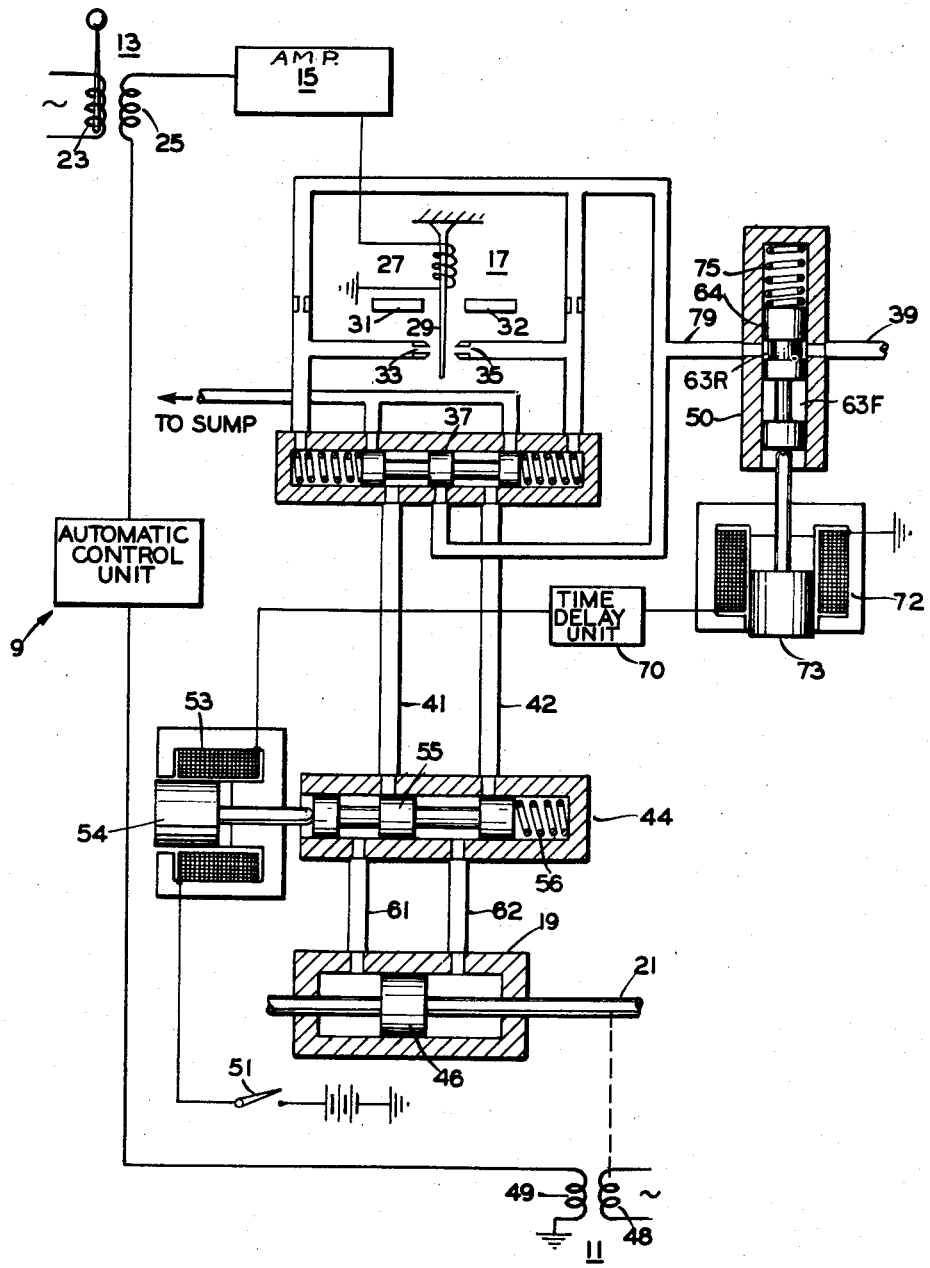
INVENTORS
JACK BRANDSTADTER
CHARLES MCWILLIAMS
BY
Oscar B Brumback
ATTORNEY

__

2,944,524

ENGAGING MEANS FOR HYDRAULIC SERVO SYSTEM

Jack Maxwell Brandstadter, Bronx, N.Y., and Charles Warner McWilliams, Arlington, N.J., assignors to Bendix Aviation Corporation, Teterboro, N.J., a corporation of Delaware Filed Aug. 10, 1954, Ser. No. 448,879

6 Claims. (Cl. 121—38)

This invention relates generally to automatic control systems having a fluid operated power means and, more particularly, to apparatus for initially placing the servosystem into operation.

Systems as complex as most automatic control systems are likely to break down or work improperly despite extreme care in the design, inspection and testing of the systems and components making up the systems. Such malfunctioning may not become evident until after the automatic control is placed in operation. Thus, the critical operation time is when the automatic control is first engaged, for due to the rapidity of operation, a hazardous or destructive condition may arise, if the automatic control system is not functioning properly before the automatic control system can be disengaged and the condition corrected.

An object of the present invention, therefore, is to provide a novel servosystem having an arrangement for limiting the authority of the servosystem over a controlled element for a short interval of time after initial engagement of the system with the controlled element.

The present invention contemplates an automatic control system having a fluid operated power means with a novel arrangement for engaging the power means with the automatic control means for operating a controlled element at a limited value of operation by the power means until after an interval of time has passed during which it can be ascertained that the power means is operating satisfactorily in connection with the automatic control system.

The foregoing and other objects and advantages of the invention will appear more fully hereinafter from a consideration of the detailed description which follows, taken together with the accompanying drawing wherein one embodiment of the invention is illustrated by way of example. It is to be expressly understood, however, that the drawing is for the purpose of illustration and description only, and is not intended as a definition of the limits of the invention.

The single sheet of drawing shows schematically the novel servosystem of the present invention incorporated in a control system for the surface of an aircraft.

Turning now to the drawing, the automatic control system 9 is intended to represent a conventional type of automatic control system for the automatic steering of an aircraft. The conventional manual control for steering the craft does not constitute part of the invention and is not shown herein. Only the follow-up 11 and manually operable control 13 of the automatic control system are shown in detail for purposes of simplicity, the other components being shown in block form. These units constitute a signal chain for amplifier 15 whose output operates a transfer valve 17, which, in turn, controls the movement of a hydraulic ram 19 which displaces, through bar 21, a control surface (not shown) of a craft. To this end, the rotor 23 of inductive device 13 is displaced relative to a stator 25 to develop a signal which is applied to a coil 27 surrounding a movable armature 29.

Armature 29 is normally centered but, depending upon the sense of the signal to winding 27, the armature is drawn toward one of the poles of magnets 31 and 32. When armature 29 is centered equal impedance to the flow of fluid through orifices 33 and 35 is afforded by the armature. When the armature moves closer to one orifice than to the other, the pressure at one orifice is increased and at the other orifice is decreased, thereby providing a differential pressure which moves spool 37 to the right or left. Pressure fluid from a suitable source (not shown) is supplied through lead 39 to leads 41 or 42, depending upon the direction of movement of valve spool 37. This pressure fluid, when solenoid operated valve 44 is operated, is supplied to one side of piston 46 constituting the hydraulic ram which moves the control surface of the craft.

The movement of the ram displaces a rotor 48 relative to a stator 49 to develop a follow-up signal corresponding to the extent of displacement of the surface. This follow-up signal builds up until it is equal and opposite to the signal from inductive device 13, whereupon the net input through signal amplifier 15 becomes zero and the operation of the ram 19 stops.

Under favorable conditons the foregoing apparatus operates satisfactorily; however, should the automatic control system, for some reason, be operating improperly and the control surface be engaged with the servosystem, the surface may be moved to such a position as to endanger the craft before the malfunctioning can be observed and corrected. In accordance with the present invention, therefore, a novel means is provided for limiting the operation of the automatic control system on the control surface until an interval of time has elapsed sufficient to determine that the automatic control is operating satisfactorily.

In accordance with the present invention, a system is provided comprised of a solenoid operated valve 44 and a solenoid operated valve 50. As switch 51 is moved to a closed circuit position, solenoid 53 is energized urging plunger 54 outwardly and moving spool 55 to the right against the bias of spring 56. This allows the flow of pressure fluid from conduits 41 and 42 through conduits 61 and 62. The pressure fluid to transfer valve 17, however, must pass through the constricted opening 63R formed by spool 64 in flowing to conduits 41 and 42. This limits the flow of pressure fluid, thereby limiting the authority of the servosystem on the controlled element. A pair of grooves in spool 64 provides for the restricting of the fluid pressure. The groove forming the opening 63R between the valve wall and valve spool is shallow and restricts or throttles the flow of fluid. The groove forming the opening 63F, however, is deeper providing substantially no throttling of the fluid.

After a predetermined interval of time during which the human pilot can observe that the automatic control system is operating the craft in a satisfactory manner, a conventional time delay device 70 closes the circuit to solenoid 72. The energized solenoid urges plunger 73 upward, moving spool 64 against the bias of spring 75 and placing full line pressure on conduit 79. The servosystem now operates at full capacity to control the movement of the craft surface in a normal manner.

As illustrated in the drawing, the novel automatic control system 9 is in the condition wherein it is ineffective on the surface. The components 11, 13 and 15 of the automatic control system 9, however, may be operative. Member 29 may be moved in response to signals fed to amplifier 15 by inductive devices 11 and 13 but the differential pressure developed at least 41 and 42 at this time is not transmitted to conduits 61 and 62 because of spool 55 of valve 44 being centered so that its lands block such transmission. During this time, the craft is controlled by other means (not shown).

Moving switch 51 to a closed circuit position energizes solenoid 53 to place the automatic control system 9 into operation. The movement of plunger 54 to the right upon the energization of solenoid 53 also moves spool 55 to the right compressing spring 56. The lands of spool 55 now clear the inlet and outlet ports so that fluid can flow from conduits 41 and 42 to conduits 61 and 62. Now, as member 29 is moved to the left or right in response to control signals, the differential pressure is applied to piston 46.

Although valve 55 has been moved to the right, plunger 73 remains in the position shown and the narrow passageway 63R restricts the flow of fluid from input line 39 to output line 79. Thus, the pressure applied to piston 46 when member 29 is displaced to the right or the left will be less than full pressure so that the piston slowly moves from its center position.

After the lapse of a predetermined length of time as set by the delay unit 70, solenoid 72 is energized. Plunger 73 moves upwardly from the position shown, urging spool 64 upwardly and compressing spring 75. The greater groove area at opening 63F permits substantially full line pressure to be applied to the opposite sides of piston 46, and the control surface will be moved under the full power of the system.

During the delay period before solenoid 72 is energized, the human pilot can observe the operation of the system under the restricted operating conditions and, if the system be operating improperly, can open switch 51 and deenergize solenoid 53 whereupon spring 56 will move valve 55 to the position shown. Thus, the automatic control system can be rendered ineffective before the craft is placed in a dangerous attitude. At any other time, the human pilot, if he wishes, can render the automatic control system ineffective on the aircraft by opening switch 51 and cutting off the flow of fluids through conduits 61 and 62.

The foregoing has presented a novel arrangement which operates the power means of a servosystem at less than its full value when the system is initially engaged for operation; but which, after the system has demonstrated satisfactory operation, operates the power means at full value.

Although only one embodiment of the invention has been illustrated and described in detail, it is to be expressly understood that the invention is not limited thereto. Various changes can be made in the design and arrangement of the parts without departing from the spirit and scope of the invention as the same will now be understood by those skilled in the art.

What is claimed is:

1. In a hydraulic servo system for operating a control surface of a craft, means for conducting a pressure fluid, a fluid motor, means connecting said conducting means and said motor, and comprising a first solenoid operated valve means for initially limiting the flow of pressure fluid to said motor upon actuating the system, a second solenoid operated valve means for stopping fluid flow to said motor upon deactuating the system, and flow control means for controlling the flow of fluid to said motor, and manually operated switch means actuating the system and for energizing and deenergizing said first and second solenoid operated valves, and time delay means interposed between said manually operated switch means and said first solenoid operated valve to make available full fluid to said motor a predetermined time after actuation of said system.

2. In a hydraulic servo system for operating a control surface of a craft, a conduit for conducting pressure fluid, a fluid motor, means connecting said conduit and said motor and including means for controlling fluid flow to said motor, characterized by the improvement comprising other means initially restricting the flow of pressure fluid to said first mentioned control means and thereby to said motor when said system is actuated so that the motor may be initially operated only within a relatively slow speed range, and time delay means operatively connected to said fluid flow control means and effective a predetermined interval of time after actuation of said system for operating said other fluid restricting means so as to permit full fluid flow in said system and thereafter operation of the motor at normal speed.

3. In a hydraulic servo system for operating a control surface of a craft, a fluid operated hydraulic motor, means for conducting fluid pressure for actuating said fluid motor, and a control unit for regulating the fluid flow to said motor, characterized by the improvement comprising first valve means in a first position for restricting the fluid flow to said control unit, timing means for actuating said first valve means to a second full fluid flow position a preset length of time after actuation of the system, said first valve means effective under said restricted fluid flow conditions so that the hydraulic motor will not be abruptly operated, second valve means for preventing fluid flow to said motor when the system is deactuated, said control unit, first and second valve means being connected in series between said pressure conducting means and said motor, and manually operable means for actuating and deactuating said system and operating said first and second valve means.

4. In a hydraulic servo system for operating a control surface of a craft, fluid control means, a fluid motor, first valve means connecting said control means and said motor, and means for conducting a pressure fluid; the improvement comprising second valve means for connecting said pressure fluid conducting means to said fluid control means, means for actuating said first connecting valve means and other means for actuating said second connecting valve means, timing means between said first and second mentioned actuating means and operatively controlled by actuation of said first mentioned actuating means to effect actuation of said second actuating means a preset length of time after said first actuating means, whereby said second connecting valve means remains immobile for a preset length of time after the actuation of said first connecting valve means to limit the flow of pressure fluid to said fluid control means for said fluid motor and thereby limit the speed of operation of the motor, and said second connecting valve means being so arranged as to be thereafter operated by said timing means so as to admit full fluid flow through said control means to said motor to permit a more rapid speed of operation of said motor.

5. In a hydraulic servo system for operating a control surface of a craft, a conduit for conducting pressure fluid, a fluid motor, and control means connected between the fluid pressure conduit and the fluid motor for controlling fluid flow to said motor, characterized by the improvement comprising second fluid control means connected between said pressure fluid conduit and said first mentioned control means for initially limiting the flow of pressure fluid to said first mentioned control means and thereby to said motor so that the fluid motor may not be abruptly operated upon the system being initially actuated, timing means operatively connected to said second fluid control means, third control means operable in one sense to initiate operation of the timing means, said timing means being effective a predetermined interval of time after the initiation of operation thereof to actuate said second fluid control means so as to make available full fluid flow to said first mentioned fluid control means so that the fluid motor may thereafter be operated at normal speed, and said third control means being alternately operable in another sense to render said timing means ineffective.

6. The combination defined by claim 5 including valve means connected between the first mentioned control means and the fluid motor, actuating means for said valve means responsive to operation of said third control means in said one sense to actuate said valve means so as to permit flow of pressure fluid to said motor, and said actuating means being responsive to operation of said third control means in said other sense to effectively actuate said valve means so as to prevent flow of pressure fluid to said motor.

References Cited in the file of this patent

UNITED STATES PATENTS

| | | |
|---|---|---|
| 1,938,762 | Haas | Dec. 12, 1933 |
| 2,188,834 | Fischel | Jan. 30, 1940 |
| 2,316,235 | Gast | Apr. 13, 1943 |
| 2,429,189 | Maddox | Oct. 14, 1947 |
| 2,604,074 | Glenny | July 22, 1952 |
| 2,611,560 | Harcum et al. | Sept. 23, 1952 |
| 2,618,292 | Ring | Nov. 18, 1952 |
| 2,620,772 | McLane | Dec. 9, 1952 |
| 2,649,841 | Jacques | Aug. 25, 1953 |
| 2,738,772 | Richter | Mar. 20, 1956 |
| 2,751,752 | Metcalf | June 26, 1956 |

FOREIGN PATENTS

| | | |
|---|---|---|
| 571,979 | Germany | May 16, 1933 |